(12) United States Patent
Stanfield

(10) Patent No.: US 11,971,474 B2
(45) Date of Patent: Apr. 30, 2024

(54) RADAR IMAGE DATA PROCESSING AND MANIPULATION

(71) Applicant: R2 Space, LLC, Ann Arbor, MI (US)

(72) Inventor: Clyde Stanfield, Ann Arbor, MI (US)

( * ) Notice: Subject to any disclaimer, the term of this patent is extended or adjusted under 35 U.S.C. 154(b) by 41 days.

(21) Appl. No.: 17/556,128

(22) Filed: Dec. 20, 2021

(65) Prior Publication Data
US 2022/0206139 A1    Jun. 30, 2022

Related U.S. Application Data

(60) Provisional application No. 63/131,214, filed on Dec. 28, 2020.

(51) Int. Cl.
*G01S 13/90* (2006.01)
(52) U.S. Cl.
CPC ............................... *G01S 13/9005* (2013.01)
(58) Field of Classification Search
CPC .................................................. G01S 13/9005
See application file for complete search history.

(56) References Cited

PUBLICATIONS

Schwartzkopf, Wade, et al. "Sentinel-1 Metadata Conversion for SICD." EUSAR 2018; 12th European Conference on Synthetic Aperture Radar. VDE, 2018. (Year: 2018).*

Uppuluri, Avinash V., and Randy J. Jost. "MATLAB-based ERS SAR data acquisition and processing software for classroom use." Proceedings of the 2004 IEEE Radar Conference (IEEE Cat. No. 04CH37509). IEEE, 2004. (Year: 2004).*

Schwartzkopf, Wade, et al. "Generic Processing of SAR Complex Data Using the SICD Standard in Matlab." IGARSS 2019-2019 IEEE International Geoscience and Remote Sensing Symposium. IEEE, 2019. (Year: 2019).*

Krul'áková , M. Adobe Photoshop CS5 and MATLAB—VSCHT. CZ, 2017, dsp.vscht.cz/konference_matlab/matlab10/full_text/058_Krulakova.pdf. (Year: 2017).*

* cited by examiner

*Primary Examiner* — Ladimir Magloire
*Assistant Examiner* — Nazra Nur Waheed

(57) ABSTRACT

Various embodiments of the present technology generally relate to detecting and manipulating radar image data. More specifically, some embodiments relate to systems, methods, and computer-readable storage media for detecting, processing, viewing, and manipulating radar images in an image viewer application. Radar image data captured by a radar imaging system, such as a synthetic aperture radar (SAR) or other satellite-based equipment, comprises data unreadable by image viewers. In an implementation, an open-source plug-in for an image viewer application obtains SAR data, performs one or more algorithms on the SAR data to detect an image, and provides the detected image to an image viewer for display on a graphical user interface. Further, requests for manipulation of the detected image made by the image viewer application may be performed by the plug-in and exported in complex data formats for use downstream.

20 Claims, 7 Drawing Sheets

100

RADAR IMAGE DATA PROCESSING AND MANIPULATION

RELATED APPLICATIONS

This application hereby claims the benefit and priority to U.S. Provisional Application No. 63/131,214, titled "RADAR IMAGE DATA PROCESSING AND MANIPULATION," filed Dec. 28, 2020, which is hereby incorporated by reference in their entirety.

TECHNICAL FIELD

Various embodiments of the present technology generally relate to rendering and manipulating radar-based image data. More specifically, some embodiments relate to system, methods, and devices for detecting, processing, viewing, and manipulating radar images in an image viewer application.

BACKGROUND

Radar imaging systems, such as satellites equipped with a synthetic aperture radar (SAR) or other radar-based imaging equipment, have the ability to capture radar data by transmitting signals to designated targets and receiving pulse data from echoes off of the targets. Pulse data collected by radar-based equipment comprises complex raw data, made up of samples with in-phase and quadrature parts, requiring tools to process the raw data in order for image viewers to display captured images in a graphical user interface. Processing the raw data requires the use of multiple algorithms that convert the raw data into sensor independent complex data (SICD), which may then be detected by certain image viewers. SICD data comprises metadata captured by the satellite-based equipment which allows image manipulation programs to perform unique calculations on the images. However, only few complex, expensive applications can render SICD data and manipulate it, as detected, to be used downstream, making radar image data inaccessible without these applications.

Image manipulation is a process of altering image data into a desired form or format. In the radar imaging context, image manipulation is a process of reconstructing and/or reformatting radar image data into visual data to view and edit the captured images, among other features. Image viewers typically limit the types of input or output data, thus restricting input of raw data or SICD data. Therefore, users must rely on time-consuming algorithmic processes to convert raw data before using any image viewers, and even then, functionality may be limited in the program. For example, radar image data of a field may be captured in multiple exposures or data files requiring complex processing of each file to generate images. The images may then be viewed in a program, such as a raster graphics editor, but may only be modified in certain ways, such as cropping or scaling, in accordance with the program's functionality. Additionally, the program may only allow exportation of a standard image format, thus making it difficult for downstream users to view previous manipulations of a file's metadata or make further changes themselves.

It is with respect to this general technical environment that aspects of the present technology disclosed herein have been contemplated. Furthermore, although a general environment has been discussed, it should be understood that the examples described herein should not be limited to the general environment identified in the background
Overview Various embodiments of the present technology herein generally relate to systems, methods, and computer readable media for processing, detecting, and manipulating radar image data captured by a radar imaging system, such as one or more satellites or satellite equipment. A computing apparatus, in various implementations, provides for streamlined processing of radar image data to be viewed and modified in an image viewer application. In an implementation, the computing apparatus comprises one or more computer-readable storage media and program instructions stored on the one or more computer-readable storage media that, when executed by a processing system, direct the processing system to obtain synthetic aperture radar data produced by a radar imaging system, generate detected image data based on the synthetic aperture radar data, and communicate, via an application programming interface to an image viewer application, the detected image data to be displayed as an image by the image viewer application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter While multiple embodiments are disclosed, still other embodiments of the present technology will become apparent to those skilled in the art from the following detailed description, which shows and describes illustrative embodiments of the invention. As will be realized, the technology is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings in which.

Figure 1:
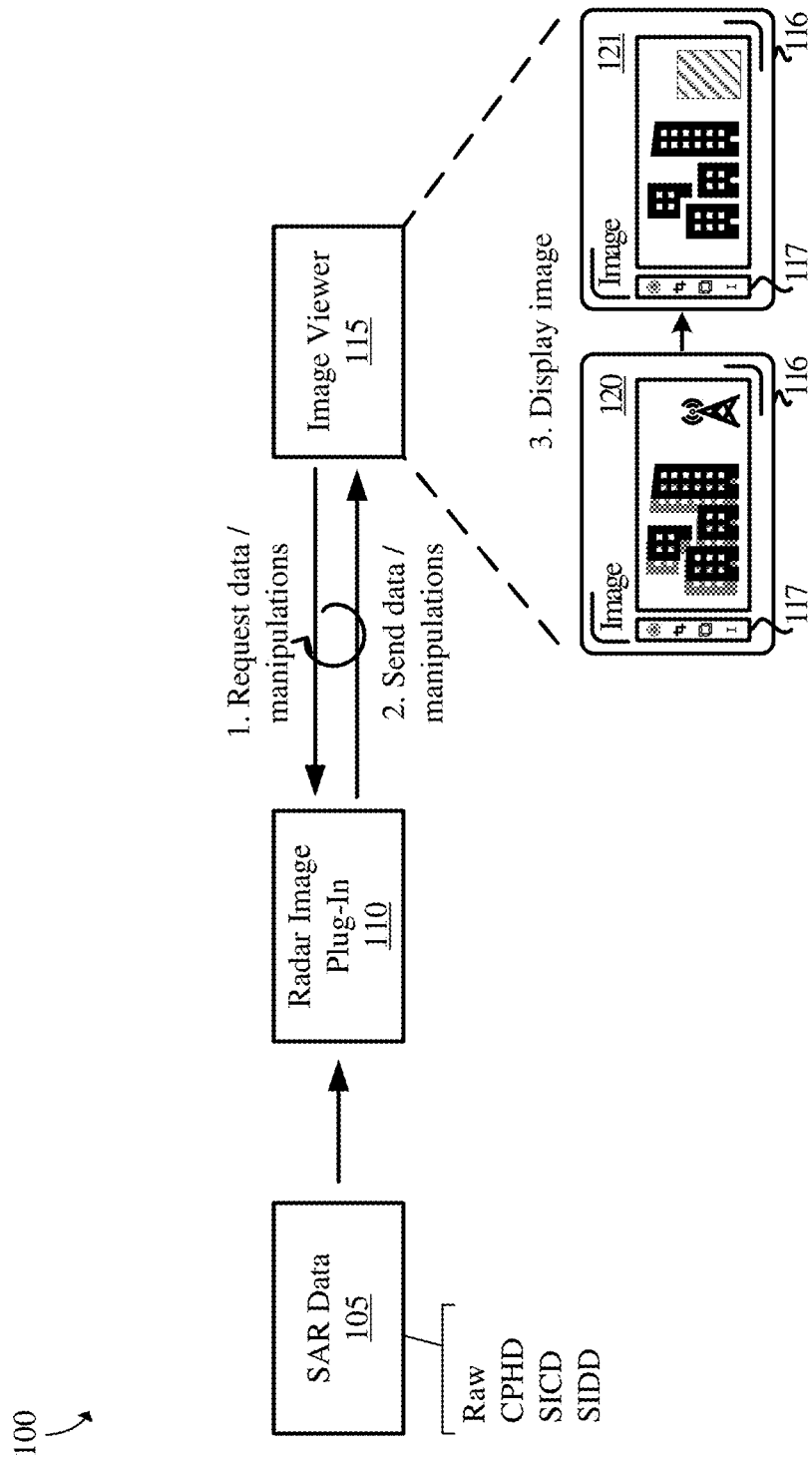
FIG. 1 illustrates an exemplary operating environment in accordance with some embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to systems, methods, and computer-readable media for detecting, processing, viewing, and manipulating radar images in an image viewer application. Radar data captured by a radar imaging system, like synthetic aperture radar (SAR) technology equipped to a satellite, for example, comprises raw data ordinarily not viewable by image viewers. Raw data may include both in-phase and quadrature parts, thus, samples of images captured cannot be detected or viewed. Raw data, in an unprocessed state, is uncompensated pulse data rather than pixels that form an image and has not undergone motion compensation or dechirping. Therefore, in order to view targets captured by a SAR, raw data must be converted using various algorithms and detected by an image viewer, such as a raster graphics editor. Using a radar plug-in to an image viewer application, SAR data can be converted from one of multiple formats to a detected image format whereby a user can view one or more images captured by the satellite and manipulate them. Moreover, the radar plug-in can write not only the detected image, but also it can write radar images in complex data forms. The plug-in can then export the manipulated radar data in a variety of formats, including complex formats, for further viewing and manipulating downstream.

The radar plug-in tool recognizes SAR data in its raw form, compensated phase history data (CPHD) form, sensor independent complex data (SICD) form, and sensor independent detected data (SIDD) form, among others. Once the plug-in obtains the data and recognizes its form, it performs a series of algorithms on the SAR data to surface a rendering on a graphical user interface to an image viewer. The plug-in communicates with the image viewer over an application programming interface (API), or by some other data communication method. In some embodiments, the plug-in applies algorithms, fast-Fourier transform (FFT) calculations, polar formatting, and other image detection calculations. For example, the radar plug-in tool may perform a two-dimensional (2D) FFT on a SICD form to process the complex data from the image domain to the frequency domain. In the frequency domain, functions such as scaling the image or extracting a time series from the data can be performed.

In various embodiments of the present technology, a computing apparatus may provide for processing SAR data into a detected image for display and manipulation to be displayed in an image viewer application. In an implementation, the computing apparatus comprises one or more computer-readable storage media and program instructions stored on the one or more computer-readable storage media that, when executed by a processing system, direct the processing system to obtain synthetic aperture radar data produced by a radar imaging system, generate detected image data based on the synthetic aperture radar data, and communicate, via an application programming interface to an image viewer application, the detected image data to be displayed as an image by the image viewer application. Using the aforementioned example, manipulations, such as image projection calculations, may be performed and stored in the SICD form's metadata. Upon opening the SICD file at a later time using the plug-in to an image viewer, annotations made to the metadata may be viewed and further manipulated by downstream users.

Other embodiments refer to methods for detecting radar image data in a plug-in and transmitting a detected image to an image viewer for display. Such methods comprise, in a plug-in tool to an image viewer application, obtaining synthetic aperture radar data produced by a radar imaging system, generating detected image data based on the synthetic aperture radar data, communicating, via an application programming interface to the image viewer application, the detected image data to be displayed as an image by the image viewer application, and in the image viewer application, displaying the detected image data on a graphical user interface.

Now referring to the Figures, FIG. 1 illustrates an exemplary operating environment in accordance with some embodiments of the present technology. Figure includes environment 100 which further includes SAR data 105, radar image plug-in 110, image viewer 115, graphical user interface 116, toolbar 117, and images 120 and 121.

In various embodiments, SAR data 105 comprises complex radar data acquired by the use of a synthetic aperture radar or other satellite-based radar equipment. SAR data 105, without being processed, cannot ordinarily be detected and viewed in an image viewer due to its complexity and lack of real pixel values. SAR data 105 may be accessed via a data repository to import data into radar image plug-in 110. Based on the format of data imported to radar image plug-in 110, the plug-in runs one or more processing algorithms on SAR data 105 to detect an image from the data. If, for example, SICD data is imported to radar image plug-in 110, the plug-in must only detect the image without requiring additional processing.

In step 1, image viewer 115 sends a request for an image to radar image plug-in 110. Radar image plug-in 110 and image viewer 115 communicate over an application programming interface (API). In some embodiments, the API is a Python API. In other embodiments, the communication link may be established by another call, API, or secure file transfer protocol. Step 2 illustrates radar image plug-in sending detected image data to the image viewer 115. As shown by step 3, image viewer 115 displays the detected image on graphical user interface 116. On graphical user interface 116, image modification functions native to image viewer 115 are selectable on toolbar 117, which allows a user to manipulate the image in limited ways. Toolbar 117 demonstrates several features such as cropping, resizing, and annotating. If a user wishes to make radar-based manipulations to the image, image viewer 115 may request radar image plug-in 110 to make modifications. In other embodiments, radar image plug-in 110 makes modifications without any request from the image viewer.

Radar image plug-in 110 comprises additional image modification functions such as time slicing, change detection, FFT calculations, image overlaying, registration, image blurring, remapping, and the like. These functions take advantage of the complex samples and metadata present in SAR data 105 that provides insight into the images, such as geoposition and timing. Radar image plug-in 110 can annotate and modify the image at the metadata level to reflect such changes. As an example, a satellite equipped with a SAR may capture a city landscape at one point in time, then capture the same target at a later point to understand the city's growth. Radar image plug-in 110 can use a registration function to align the two images at the sub-pixel level to determine even miniscule changes.

After radar image plug-in 110 makes modifications to the detected image based on the request from image viewer 115, image viewer 115 displays an updated image on graphical user interface 116. Image 120 illustrates a detected image before a modification request is made by image viewer 115. In image 120, captured structures are blurry and misaligned. Subsequently, image 121 illustrates an updated detected image after a modification request is completed by radar image plug-in 110. As shown by image 121, the structures are aligned at the pixel level and a sensitive target, namely the tower shown in image 120, is blurred. Radar image plug-in 110 may save image 121 in a variety of formats for future use, including, but not limited to, SICD and SIDD data. The ability to save updated images in SICD format provides an advantage to downstream users as they will be able to see any annotations or modifications made to the SICD data and process the data through downstream Full Spectral GEOINT algorithms or Automated Detection algorithms. Unlike standard image formats, SICD and SIDD data comprise complex metadata. Thus, downstream users can continue to modify such metadata even after initial modifications are completed by radar image plug-in 110 without the use of complex, expensive image processors.

Figure 2:
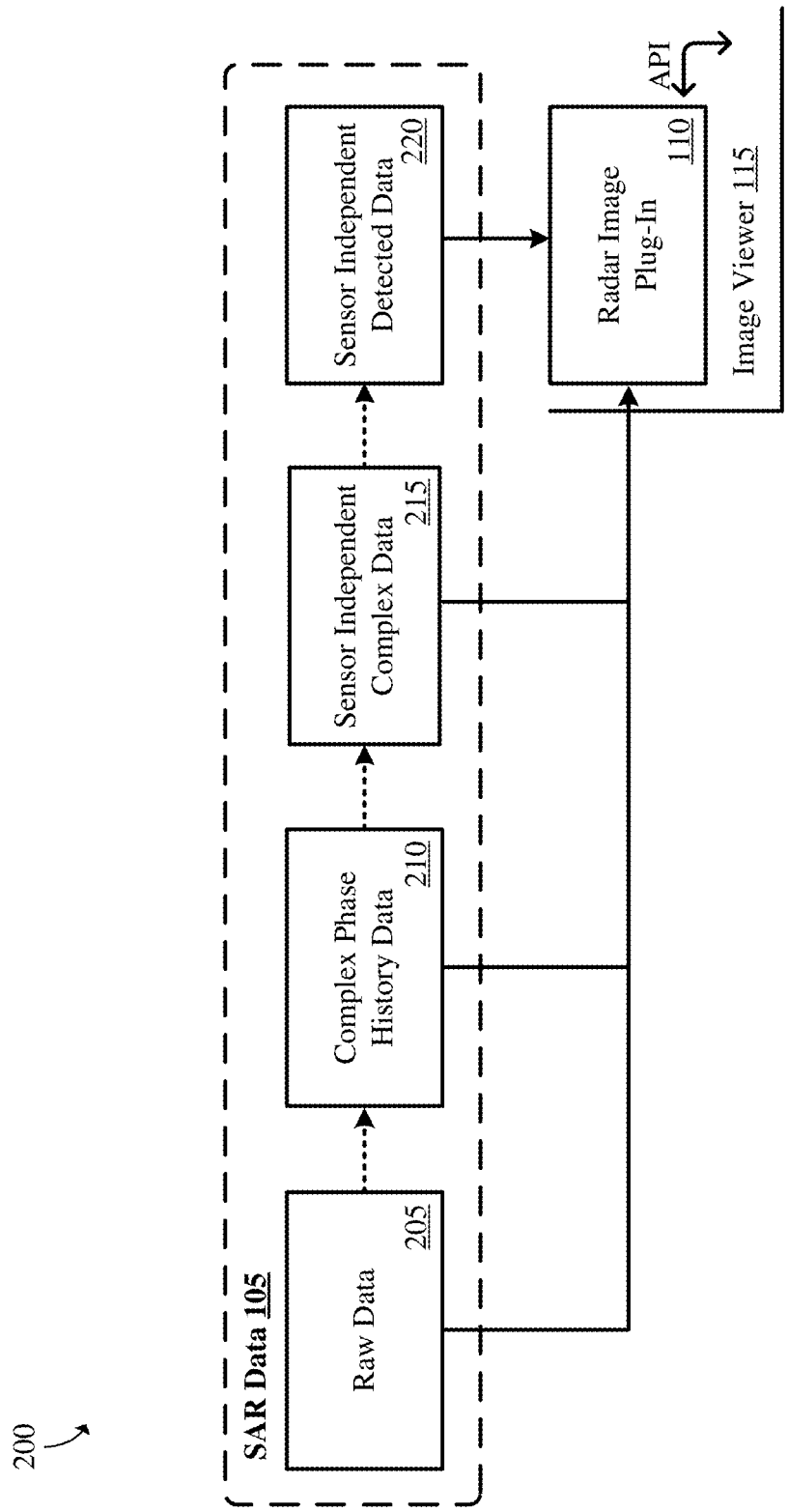
FIG. 2 illustrates an exemplary processing environment in which some embodiments of the present technology may be utilized.

FIG. 2 illustrates an exemplary processing environment 200 in which some embodiments of the present technology may be utilized. FIG. 2 demonstrates inputting one of multiple formats of radar data into a radar image plug-in to detect images. FIG. 2 includes environment 200 which further includes SAR data 105, raw data 205, compensated phase history data 210, sensor independent complex data 215, sensor independent detected data 220, radar image plug-in 110, and image viewer 115.

In some embodiments, SAR data 105 comprises raw data 205 captured by satellite-based equipment, such as a synthetic aperture radar (SAR) that is undetectable by image viewers without any pre-processing to the data. Raw data 205 comprises uncompensated received pulse data rather than pixels that form an image. Used as an input to radar image plug-in 110, the radar image plug-in 110 performs algorithms and image processing to raw data 205, so that it can detect an image in the data.

After some pre-processing, SAR data 105 comprises radar data formatted as compensated phase history data 210 (CPHD). CPHD 210, like raw data 205, is also ordinarily not viewable in image viewers because it represents complex pulse data. In various embodiments, raw data 205 undergoes one or more image processing algorithms to obtain CPHD 210, which also may be input into radar image plug-in 110. In order for radar image plug-in 110 to view an image from data in CPHD 210 format, processing such as fast-Fourier transforms (FFTs) and polar formatting are performed on the data so that the image can be detected and viewed.

Next, by performing such further image processing algorithms on CPHD 210, like FFTs and polar formatting, radar image plug-in 110 reconstructs the image data into sensor independent complex data 215 (SICD). Radar data in SICD 215 form comprises polar formatted image data that must further be detected by radar image plug-in 110 to be communicated to image viewer 115. One step further, radar plug-in 110 can detect, or convert from complex data to viewable data, SICD 215 to sensor independent detected data 220 (SIDD). SIDD 220 comprises a fully detected image that can be read by radar image plug-in 110 and displayed by image viewer 115.

In various embodiments, radar image plug-in 110 can automatically read, process, and detect any of raw data 205, CPHD 210, SICD 215, or SIDD 220. Thus, SAR data 105 in various forms and stages of processing may be input to view fully detected and formatted images captured by a radar imaging system, such as satellite-based imaging equipment. Image viewer 115 serves as a graphical user interface to display detected images. Radar image plug-in 110 may first receive a request from image viewer 115 to detect an image in a file. After detecting the image, radar image plug-in 110 communicates or transmits the data to image viewer 115 over an application programming interface (API). While image viewer 115 may have native functionality to modify images, requests for further modifications may be made to radar image plug-in 110, such as registration, phase analysis, and the like.

Both SICD 215 and SIDD 220 comprise pixel arrays and metadata that describe the data product. Metadata plays an important role in radar-based image viewers, such as image viewer 115, as it allows for manipulation of pixels, calculations at the pixel level, phase and frequency analysis, and similar modifications that become stored in the metadata for future use. In accordance with the present technology, radar image plug-in 110 makes modifications to the image based on a request by image viewer 115. Such modifications may affect data at the metadata level and the pixel level. The modifications are stored as part of SICD 215 or SIDD 220, and thus, the modifications can be viewed later upon opening and detecting the image using radar plug-in 110.

Figure 3:
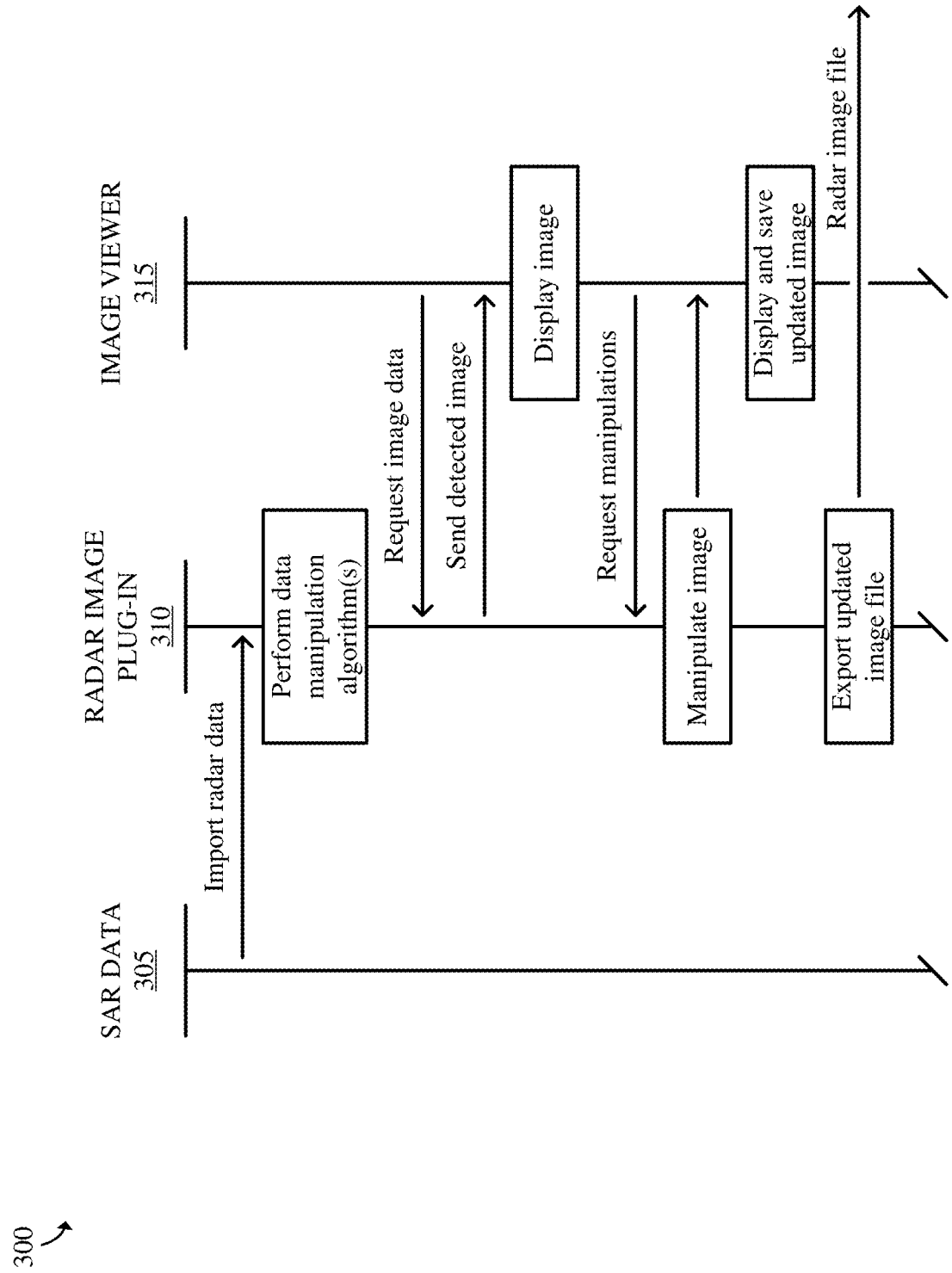
FIG. 3 illustrates a sequence diagram of data flow between various components of a radar image plug-in tool and an image viewer in accordance with some embodiments of the present technology.

FIG. 3 illustrates a sequence diagram of data flow between of a radar image plug-in tool and an image viewer in accordance with some embodiments of the present technology. FIG. 3 includes environment 300 that functions to process synthetic aperture radar data into detectable image data, manipulate the image data according to requirements, and export the manipulated image data downstream. Environment 300 further includes SAR data 305, radar image plug-in 310, and image viewer 315.

In various embodiments, SAR data 305 comprises one or more images captured from satellite-based imaging equipment, such as a SAR. In some embodiments, the SAR provides data in a raw data format unviewable by computer programs, applications, and the like due to the data being in uncompensated received pulse data rather than in pixel value. In other embodiments, the system may provide radar image data in CPHD, SICD, or SIDD formats.

In one example, raw radar data is imported to radar image plug-in 310. Radar image plug-in 310 recognizes the format of the data received by radar image data 305 and performs one or more data manipulation algorithms to render the raw image data detectable or viewable. Image viewer 315 sends a request to radar image plug-in 310 for the image. In response to the request, radar image plug-in 310 sends a detected image to image viewer 315, which allows for viewing and basic modifications to the image. Modifications that may be native to image viewer 315 include cropping, scaling, recoloring, and the like. With limited capabilities to make modifications to radar-based images, image viewer 315 requests radar image plug-in 310 to manipulate the image. Radar image plug-in 310 may allow for further manipulation functions including, but not limited to, image projection, remapping, overlaying, fast-Fourier transformation (FFT) calculations, dynamic imaging, pixel modification, phase analysis, non-linear warping, and registration. Modifications like registration allow for a user to align multiple images at a sub-pixel level. Registration may be completed by one or more algorithms, such as color multi-view and/or coherent change detection algorithms, operated by radar image plug-in 310.

In the next step, radar image plug-in 310 sends a manipulated detected image back to image viewer 315 based on the request for manipulation. Image viewer 315 may display the modified image on the graphical user interface where further modifications may be made or requested. Once modifications are complete, image viewer 315 may save the updated image. Radar image plug-in 310 may then export a radar image file to be used downstream. An image viewer like a raster graphics editor can export image files in several types of formats, including but not limited to, XCF, PNG, JPG, GIF, TIFF, and DNG among others. Radar image plug-in 310 extends the selection of image formats to radar-based image formats such as SIDD and SICD. Despite an image viewer's inability to view images in complex formats, radar image plug-in 310 allows for processing and detecting image data without the use of third-party processing tools, enabling image viewers to access SICD and SIDD files by utilizing the plug-in. To be used downstream, SICD data must undergo an inverse algorithm to convert the detected image product back to a complex form.

Figure 4:
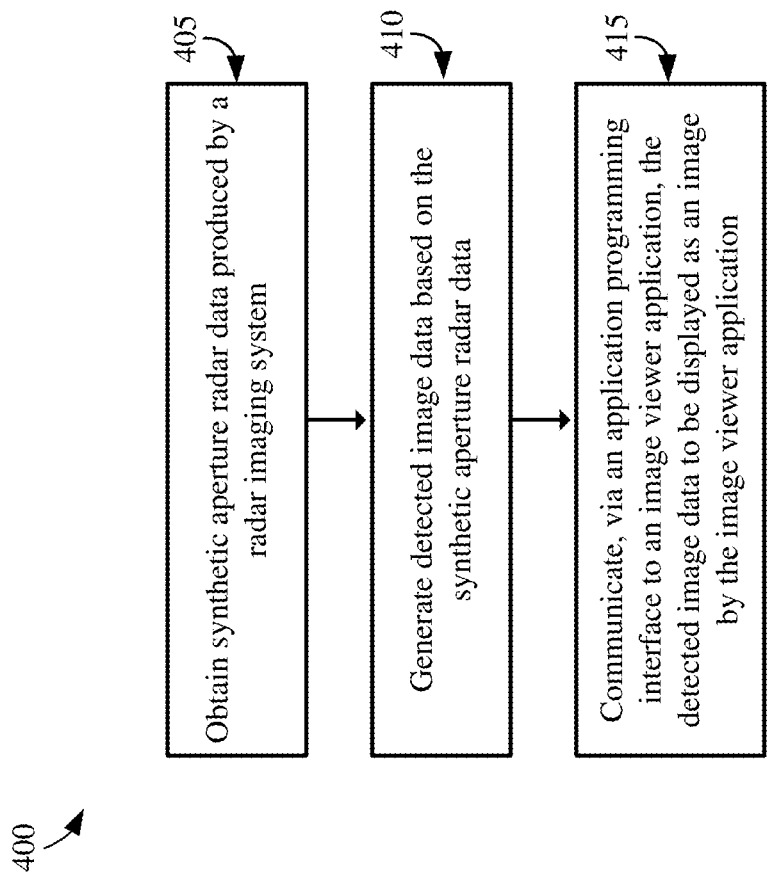
FIG. 4 is a flowchart illustrating a set of operations for detecting and displaying an image in accordance with some embodiments of the present technology.

Next, FIG. 4 is a flowchart illustrating a set of operations for radar image data reconstruction in accordance with some embodiments of the present technology. In radar image process 400, illustrated in FIG. 4, a radar plug-in for an image viewer obtains a request for radar image data and processes it for viewing and editing on a graphical user interface. Radar image process 400 may be implemented in program instructions in the context of any of the software applications, modules, components, or other programming elements deployed in one or more servers. The program instructions direct the underlying physical or virtual computing systems to operate as follows, referring to steps illustrated in FIG. 4, such as data retrieval step 405, image detection step 410, and image display step 415.

Beginning with data retrieval step 405, an image viewer plug-in obtains synthetic aperture radar data produce by a radar imaging system, such as a SAR. The plug-in tool identifies the image associated with the request and must process SAR data using one or more image processing algorithms if the image is in a format such as raw data, CPHD, or SICD. In image detection step 410, the plug-in generates detected image data based on the SAR data. Detecting the SAR data refers to converting the complex SAR data into viewable data. The plug-in then communicates, over an API to an image viewer application, the detected image data to be displayed as an image by the image viewer on a graphical user interface.

Figure 5:
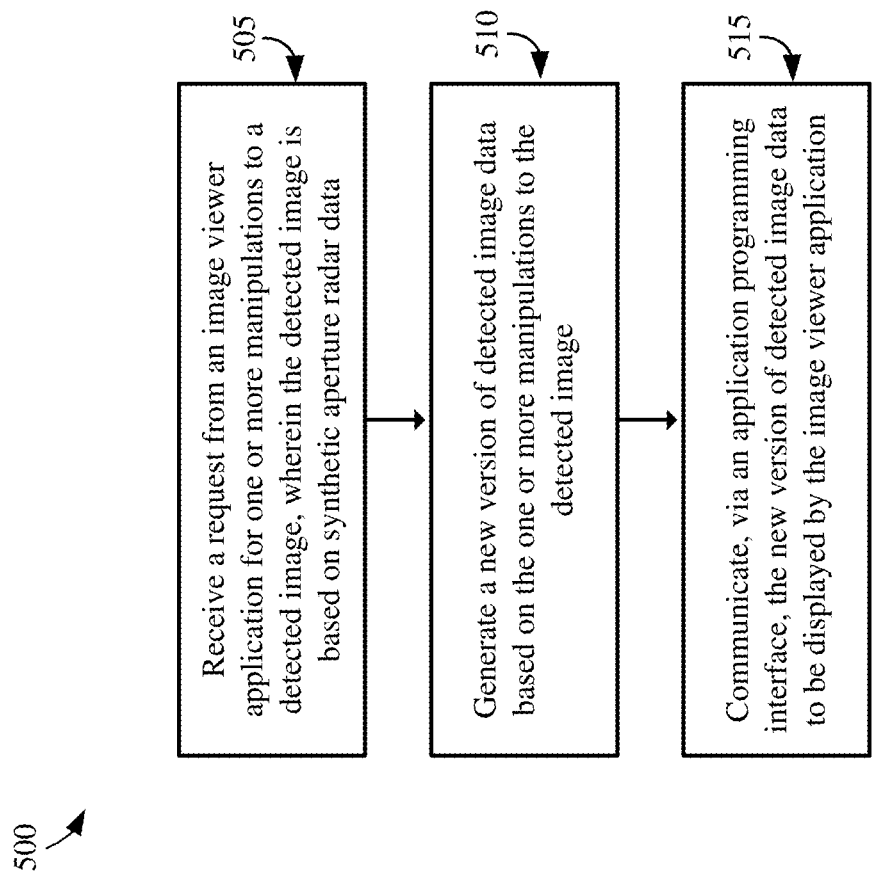
FIG. 5 is a flowchart illustrating a set of operations for manipulating radar-based images in accordance with some embodiments of the present technology.

Moving to FIG. 5, FIG. 5 demonstrates a flowchart illustrating a set of operations for manipulating radar-based images in accordance with some embodiments of the present technology. In image manipulation process 500, illustrated in FIG. 5, a plug-in tool receives a request to manipulate an image and send the updated image to an image viewer. Image manipulation process 500 may be implemented in program instructions in the context of any of the software applications, modules, components, or other programming elements deployed in one or more servers. The program instructions direct the underlying physical or virtual computing systems to operate as follows, referring to steps illustrated in FIG. 5, such as manipulation request step 505, update step 510, and display step 515.

First, at manipulation request step 505, an image viewer sends a request over an API to a plug-in tool to make one or more modifications to an image. While the image viewer itself may have native manipulation features, such as cropping, resizing, recoloring, measuring, dragging, and/or zooming in and out, for example, it lacks other functionality helpful for use on radar-based images. In various embodiments, additional features supplied by the plug-in tool comprise remapping, multiple image overlaying, modifying pixels, FFT calculations, image projection, phase analysis, and image registration. As an example, by performing FFT calculations on an image captured by a SAR, the plug-in tool can extract a time slice of the image to identify moving targets. By identifying changes of detected image data in metadata, the radar plug-in can apply the same operations to complex data and reprocess the complex data back to detected image data before rendering and displaying the image as detected. This allows the radar plug-in to perform manipulations to be viewed and further changed at later points in time.

Next, in update step 510, the plug-in tool generates a new version of detected image data based on the one or more manipulations made to the image. This occurs so that the changes are reflected in the image for viewing or manipulating downstream. Finally, at display step 515, the radar plug-in communicates or transmits, via an API, the new version of detected image data to be displayed by the image viewer. The image viewer receives all modifications and displays them on a graphical user interface. This process may be repeated until a user is satisfied with the modifications made to the image.

At import step 505, the radar image plug-in obtains a radar image file. In various embodiments, radar image file comprises raw, undetected data not suitable for display on an image viewer or GIMP, as an example. At reconstruction step 510, the radar plug-in performs a first image reconstruction algorithm using the raw radar image file data to create compensated phase history radar image data (CPHD). From here, at transformation step 515, the radar plug-in performs algorithms and calculations, like a two-dimensional fast-Fourier transform among other calculations, using the CPHD data to create complex radar image data. The radar plug-in may also polar format the CPHD data to create a full SICD with better image quality than a 2D FFT complex product. Finally, at display step 520, the radar plug-in detects the image, reads the data, and surfaces the image in a graphical user interface. At this stage, the radar image data is fully detectable by an image viewer, such as GIMP, and can be read as sensor independent detected data.

Figure 6:
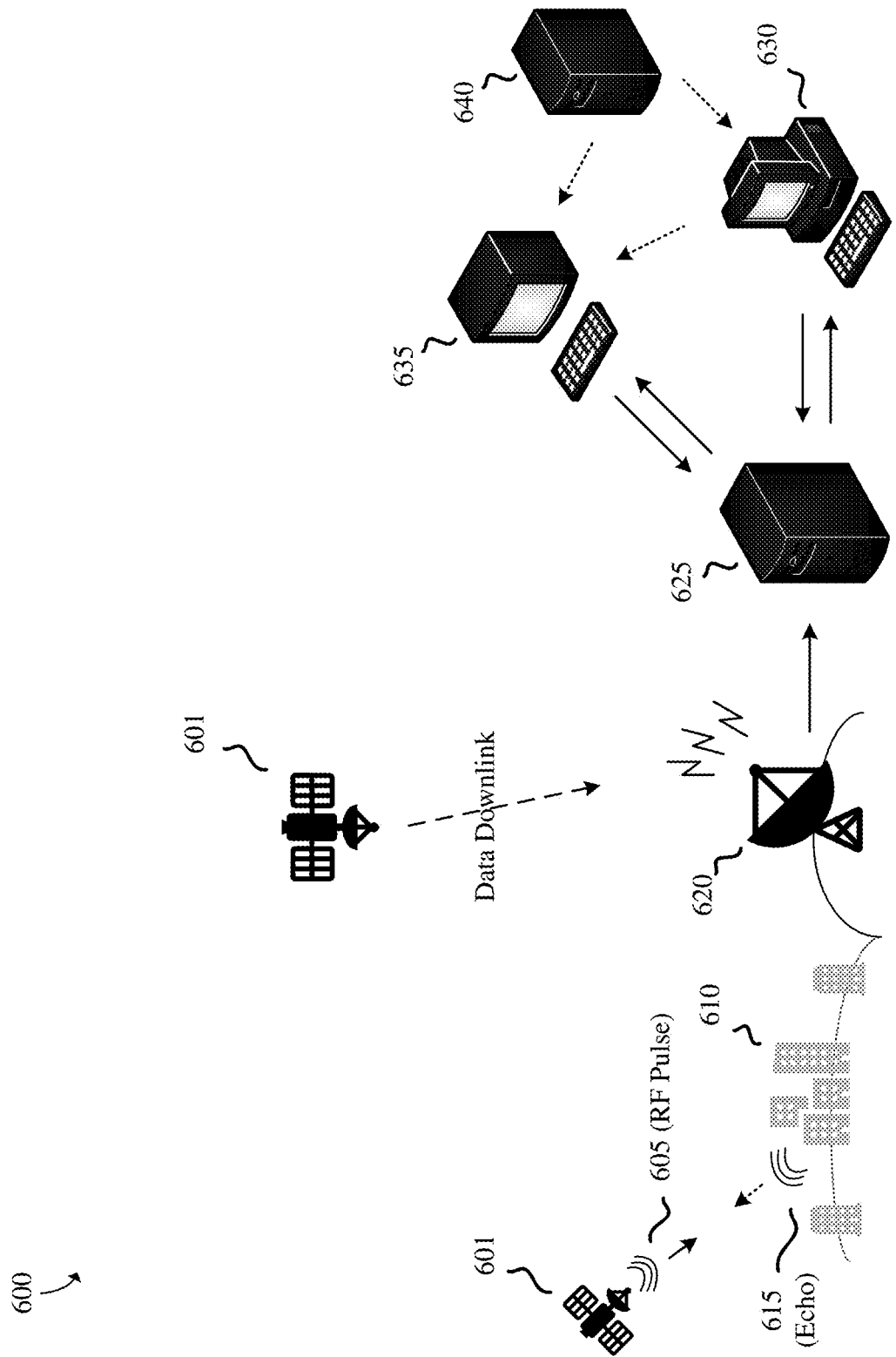
FIG. 6 illustrates an exemplary operating environment in which some embodiments of the present technology may be utilized.

FIG. 6 illustrates an exemplary operating environment 600 in which some embodiments of the present technology may be utilized. First, FIG. 6 illustrates a satellite equipped with a synthetic aperture radar (SAR) to transmit and receive radar data from a target on Earth. Once radar data is captured by the satellite, the data is transferred to a computing system to be accessed. FIG. 6 includes environment 600, wherein environment 600 further includes satellite 601, RF pulse 605, image target 610, echo 615, radar station 620, server 625, first computer 630, second computer 635, and application server 640.

In various embodiments, satellite 601 transmits, via a SAR, a radio frequency or RF pulse 605 while flying in orbit over image target 610. Satellite 601 initiates one or more of RF pulse 605, and in response, the pulses create an echo 615 that bounces off image target 610. In many embodiments, image target 610 may be a set of buildings, structures, landscapes, and the like with varying topologies. Echo 615 provides information from image target 610, such as the height and width of image target 610, for example. Echo 615 transmits back up toward satellite 601 from various perspectives and locations due to RF pulse 605 being transmitted over a period of time.

Also depicted in environment 600 is satellite 601 operating at a different location and point in time as it continues its orbit. After capturing data via echo 615, satellite 601 downlinks SAR data to radar station 620. The data downlink may operate in various frequency ranges, such as X-band, S-band, or the like. Once radar station 620 collects SAR data from satellite 601, radar station 620 may transmit the radar data to one or more databases or servers, such as server 625. In some examples, server 625 may obtain SAR data over a communication link, such as a secure file transfer protocol, an application programming interface, or the like. Server 625 may operate in a cloud environment, remote from other computing devices, or it can operate locally.

In various embodiments, the data received by server 625 comprises raw SAR data comprising pulse data undetectable by image viewers without any processing. First computer 630 accesses server 625 to obtain raw SAR data. In an optional step, first computer 630 accesses application server 640 to download a radar image plug-in to an image viewer. Alternatively, in other embodiments, first computer 630 already has a plug-in installed. After obtaining SAR data from server 625, radar plug-in operating on first computer 630 processes and detects the raw data to form a detected image. Radar plug-in communicates the detected image to the image viewer over an API to be displayed as an image on a graphical user interface. A user of first computer 630 can then manipulate the detected image and store it locally on first computer 630, communicate it back to server 625 to be obtained by other users, and/or send it to another computer or user, such as second computer 635. The image data stored or transmitted elsewhere by first computer 630 may comprise image data in SICD, SIDD, or another image file format.

Next, like first computer 630, second computer 635 can also access either or both server 625 and application server 640 to obtain SAR data and the plug-in, respectively. In some embodiments, second computer 635 accesses server 625 to download a SICD image file previously manipulated by first computer 630. The SICD image file includes annotations on its metadata indicating changes made by first computer 630. Radar plug-in detects the manipulated image in the SICD data and requests the image viewer to display it as an image with the manipulations. Second computer 635 can make further manipulations and store the manipulated image locally, and/or send the image data to server 625 or elsewhere downstream.

Figure 7:
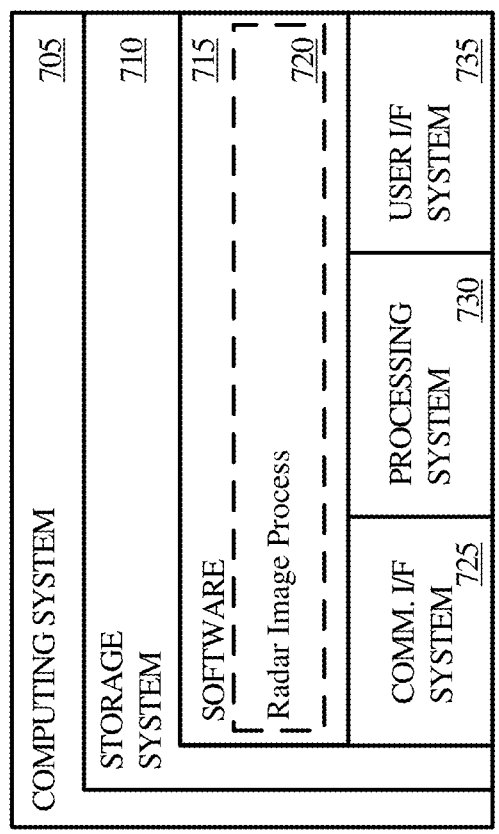
FIG. 7 illustrates an example of a computing system in accordance with some embodiments of the present technology.

FIG. 7 illustrates computing system 705 that is representative of any system or collection of systems in which the various processes, programs, services, and scenarios disclosed herein may be implemented. This computing system may be implemented in radar image plug-in 110 of FIG. 1 to facilitate radar data collection and image formation. Examples of computing system 705 include, but are not limited to, desktop computers, laptop computers, server computers, routers, web servers, cloud computing platforms, and data center equipment, as well as any other type of physical or virtual server machine, physical or virtual router, container, and any variation or combination thereof.

Computing system 705 may be implemented as a single apparatus, system, or device or may be implemented in a distributed manner as multiple apparatuses, systems, or devices. Computing system 705 includes, but is not limited to, storage system 710, processing system 730, software 715, communication interface system 725, and user interface system 735. Processing system 730 is operatively coupled with storage system 710, communication interface system 725, and user interface system 735.

Processing system 730 loads and executes software 715 from storage system 710. Software 715 includes and implements radar image process 720, which is representative of the SAR radar data and image detection processes discussed with respect to the preceding Figures. When executed by processing system 730 to provide image retrieval and image formation processes, software 715 directs processing system 730 to operate as described herein for at least the various processes, operational scenarios, and sequences discussed in the foregoing implementations. Computing system 705 may optionally include additional devices, features, or functionality not discussed for purposes of brevity.

Referring still to FIG. 7, processing system 730 may include a micro-processor and other circuitry that retrieves and executes software 715 from storage system 710. Processing system 730 may be implemented within a single processing device but may also be distributed across multiple processing devices or sub-systems that cooperate in executing program instructions. Examples of processing system 730 include general purpose central processing units, graphical processing units, application specific processors, and logic devices, as well as any other type of processing device, combinations, or variations thereof.

Storage system 710 may include any computer readable storage media readable by processing system 730 and capable of storing software 715. Storage system 710 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 710 may also include computer readable communication media over which at least some of software 715 may be communicated internally or externally. Storage system 710 may be implemented as a single storage device but may also be implemented across multiple storage devices or sub-systems co-located or distributed relative to each other. Storage system 710 may incorporate additional elements, such as a controller, capable of communicating with processing system 730 or possibly other systems.

Software 715 (including radar image process 720) may be implemented in program instructions and among other functions may, when executed by processing system 730, direct processing system 730 to operate as described with respect to the various operational scenarios, sequences, and processes illustrated herein. For example, software 715 may include program instructions for implementing image retrieval and reconstruction process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 715 may include additional processes, programs, or components, such as operating system software, virtualization software, or other application software. Software 715 may also include firmware or some other form of machine-readable processing instructions executable by processing system 730.

In general, software 715 may, when loaded into processing system 730 and executed, transform a suitable apparatus, system, or device (of which computing system 705 is representative) overall from a general-purpose computing system into a special-purpose computing system customized to provide image retrieval and reconstruction processes as described herein. Indeed, encoding software 715 on storage system 710 may transform the physical structure of storage system 710. The specific transformation of the physical structure may depend on various factors in different implementations of this description. Examples of such factors may include, but are not limited to, the technology used to implement the storage media of storage system 710 and whether the computer-storage media are characterized as primary or secondary storage, as well as other factors.

For example, if the computer readable storage media are implemented as semiconductor-based memory, software 715 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 725 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 705 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated.

In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A computing apparatus comprising:
   one or more non-transitory computer-readable storage media; and
   a radar image plug-in comprising program instructions stored on the one or more non-transitory computer-readable storage media that, when executed by a processing system, direct the computing apparatus to at least:
      establish a connection to a raster graphics editor application via an application programming interface, wherein the raster graphics editor application lacks capabilities regarding radar-based image manipulation algorithms;
      obtain synthetic aperture radar data of a ground scene produced by a radar imaging system;
      generate detected image data of the ground scene based on the synthetic aperture radar data;
      receive, via the application programming interface, a request from the raster graphics editor application to perform one or more of the radar-based image manipulation algorithms on the detected image data;
      perform the one or more radar-based image manipulation algorithms on the detected image data based on the request; and
      supply, via the application programming interface, the detected image data as manipulated to be displayed as an image of the ground scene by the raster graphics editor application.

2. The computing apparatus of claim 1, wherein the radar-based image manipulation algorithms comprise one or more of time slicing, change detection, fast-Fourier transformation, and image registration.

3. The computing apparatus of claim 1, wherein to generate the detected image data of the ground scene, the program instructions direct the computing apparatus to convert the synthetic aperture radar data of the ground scene from a first format to a second format.

4. The computing apparatus of claim 3, wherein to perform the one or more radar-based image manipulations on the detected image data, the program instructions direct the computing apparatus to perform the one or more radar-based image manipulation algorithms on metadata of the detected image data and annotate modifications made to the metadata based on the one or more radar-based image manipulation algorithms performed.

5. The computing apparatus of claim 4, wherein the program instructions further direct the computing apparatus to store an annotated version of the detected image data.

6. The computing apparatus of claim 1, wherein the synthetic aperture radar data comprises one of sensor independent complex data, sensor independent detected data, compensated phase history data, and raw radar data.

7. The computing apparatus of claim 5, wherein the annotated version of the detected image data is different from the first format and the second format.

8. The computing apparatus of claim 5, wherein the program instructions further direct the computing apparatus to perform one or more further radar-based image manipulation algorithms on the annotated version of the detected image data.

9. The computing apparatus of claim 8, wherein the program instructions further direct the computing apparatus to store a further annotated version of the detected image data including further modifications made to the detected image data based on the one or more further radar-based image manipulation algorithms.

10. A method comprising:
    in a plug-in tool to a raster graphics editor application,
       establishing a connection to the raster graphics editor application via an application programming interface, wherein the raster graphics editor application lacks capabilities regarding radar-based image manipulation algorithms;
       obtaining synthetic aperture radar data of a ground scene produced by a radar imaging system; and
       generating detected image data of the ground scene based on the synthetic aperture radar data;
    in the raster graphics editor application,
       providing, via the application programming interface, a request for one or more radar-based image manipulation algorithms on the detected image data from the plug-in tool;
    in the plug-in tool,
       performing the one or more radar-based image manipulation algorithms on the detected image data based on the request; and
       supplying, via the application programming interface, the detected image data as manipulated to the raster graphics editor application; and
    in the raster graphics editor application,
       displaying the detected image data on a graphical user interface.

11. The method of claim 10, wherein the synthetic aperture radar data comprises one of sensor independent complex data, sensor independent detected data, compensated phase history data, and raw data.

12. The method of claim 10, wherein the the radar-based image manipulation algorithms comprise one or more of time slicing, change detection, fast-Fourier transformation, and image registration.

13. The method of claim 10, wherein generating the detected image data of the ground scene comprises converting the synthetic aperture radar data of the ground scene from a first format to a second format.

14. The method of claim 13, wherein performing the one or more radar-based image manipulations on the detected image data comprises performing the one or more radar-based image manipulation algorithms on metadata of the detected image data and annotating modifications made to the metadata based on the one or more radar-based image manipulations algorithms performed.

15. The method of claim 14, further comprising:
in the plug-in tool, storing an annotated version of the detected image data.

16. The method of claim 15, wherein the annotated version of the detected image data is different from the first format and the second format.

17. The method of claim 15, further comprising:
in the raster graphics editor application, providing, via the application programming interface, a further request for one or more further radar-based image manipulation algorithms on the annotated version of the detected image data to the plug-in tool;
in the plug-in tool, performing the one or more further radar-based image manipulation algorithms and supplying, via the application programming interface, a further manipulated annotated version of the detected image data to the raster graphics editor application; and
in the raster graphics editor application, displaying the further manipulated annotated version of the detected image data on the graphical user interface.

18. A computing apparatus comprising:
one or more non-transitory computer-readable storage media; and
one or more processors operatively coupled with the one or more non-transitory computer readable storage media; and
a radar image plug-in comprising program instruction stored on the non-transitory one or more computer-readable storage media that, when executed by the one or more processors, direct the computing apparatus to at least:
establish a connection to a raster graphics editor application via an application programming interface, wherein the raster graphics editor application lacks capabilities regarding radar-based image manipulation algorithms;
obtain synthetic aperture radar data of a ground scene produced by a radar imaging system;
generate detected image data of the ground scene based on the synthetic aperture radar data;
receive, via the application programming interface, a request from the raster graphics editor application to perform one or more of the radar-based image manipulation algorithms on the detected image data;
perform the one or more radar-based image manipulation algorithms on the detected image data based on the request; and
supply, via the application programming interface, the detected image data as manipulated to be displayed as an image of the ground scene by the raster graphics editor application.

19. The computing apparatus of claim 18, wherein the radar-based image manipulation algorithms comprise one or more of time slicing, change detection, fast-Fourier transformation, and image registration.

20. The computing apparatus of claim 18, wherein the synthetic aperture radar data comprises one of raw radar data, compensated phase history data, sensor independent complex data, and sensor independent detected data.

* * * * *